United States Patent
De Lemos

(10) Patent No.: US 10,926,632 B2
(45) Date of Patent: Feb. 23, 2021

(54) FREEWHEELING SYSTEM FOR TANDEM AXLES

(71) Applicant: CNH Industrial America LLC, New Holland, PA (US)

(72) Inventor: José Francivaldo Pereira De Lemos, Sete Lagoas (BR)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/469,343

(22) PCT Filed: Dec. 12, 2017

(86) PCT No.: PCT/BR2017/050378
§ 371 (c)(1),
(2) Date: Jun. 13, 2019

(87) PCT Pub. No.: WO2018/107257
PCT Pub. Date: Jun. 21, 2018

(65) Prior Publication Data
US 2019/0359053 A1  Nov. 28, 2019

(30) Foreign Application Priority Data
Dec. 14, 2016 (BR) .......................... 102016029395.2

(51) Int. Cl.
*B60K 17/36* (2006.01)
*B60K 17/26* (2006.01)
*B60K 23/08* (2006.01)

(52) U.S. Cl.
CPC .............. *B60K 17/36* (2013.01); *B60K 17/26* (2013.01); *B60K 23/08* (2013.01); *B60Y 2400/408* (2013.01)

(58) Field of Classification Search
CPC ........ B60K 17/36; B60K 17/26; B60K 23/08; B60K 17/3515; B60Y 2400/408; B60Y 2400/421
See application file for complete search history.

(56) References Cited

U.S. PATENT DOCUMENTS

| 3,611,832 | A | * | 10/1971 | Vollmer | ................ F16H 57/031 475/198 |
| 4,625,846 | A | | 12/1986 | Gomez | |
| 4,627,512 | A | | 12/1986 | Clohessy | |
| 4,960,192 | A | | 10/1990 | Kurihara | |

(Continued)

FOREIGN PATENT DOCUMENTS

| AU | 2002300578 B2 | 10/2003 |
| DE | 102012012012 A1 | 12/2013 |

*Primary Examiner* — Drew J Brown
(74) *Attorney, Agent, or Firm* — Peter K. Zacharias; Patrick M. Sheldrake

(57) ABSTRACT

A freewheeling system for tandem axles, the system including a wheel hub, a wheel hub cover attached to an end of the wheel hub, the wheel hub cover having tines predicted thereon, an actuator chamber, a piston, a sleeve, an axle shaft, and at least one air input. The at least one air input feeding the actuator chamber in which is accommodated the piston that is engaged in the sleeve concentrically mounted in an end of the axle shaft having axial mobility, wherein the sleeve has a flange endowed with tines that mechanically cooperate with the tines predicted on the wheel hub cover.

7 Claims, 3 Drawing Sheets

(56) References Cited

U.S. PATENT DOCUMENTS

| | | | |
|---|---|---|---|
| 5,123,513 A | | 6/1992 | Petrak |
| 5,219,054 A | | 6/1993 | Teroaka |
| 5,535,869 A | | 7/1996 | Bigley et al. |
| 5,908,080 A | * | 6/1999 | Bigley ............... B60K 17/3515 |
| | | | 180/247 |
| 5,967,279 A | | 10/1999 | Itoh et al. |
| 6,234,289 B1 | | 5/2001 | Baker et al. |
| 7,000,750 B2 | | 2/2006 | Ewer |
| 9,784,355 B1 | * | 10/2017 | Brammer ............. B60K 17/165 |
| 2004/0089495 A1 | * | 5/2004 | Strain .................... F16D 1/112 |
| | | | 180/383 |
| 2008/0053780 A1 | * | 3/2008 | Hamrin ................. B60K 23/08 |
| | | | 192/54.52 |
| 2015/0266375 A1 | * | 9/2015 | Tavvala ............... B60K 17/165 |
| | | | 180/24.02 |
| 2016/0280066 A1 | * | 9/2016 | Tavvala ................. B60K 17/36 |
| 2019/0331173 A1 | * | 10/2019 | Eschenburg .......... F16D 25/061 |
| 2020/0148058 A1 | * | 5/2020 | Eschenburg ........... B60K 17/36 |

\* cited by examiner

FREEWHEELING SYSTEM FOR TANDEM AXLES

FIELD OF THE INVENTION

The present invention addresses a freewheeling system projected for being used, particularly, in tandem axles, for example, heavy vehicles for load transportation having tensile type 6×4, 8×4 or 10×4 configurations, or even tridem models consisting of three tag axles.

The freewheeling system, according to the present invention, provides the immediate change of the configurations 6×4, 8×4 or 10×4 to configurations 6×2, 8×2 and 10×2 in the situations in which the vehicle is unloaded or half-loaded. Thus, it becomes possible to substantially reduce the resistance of the vehicle's running and, therefore, bring considerable savings in wear and tear of the parts and tires and improvements in terms of fuel consumption.

BACKGROUND OF THE INVENTION

As it might be appreciated by the persons skilled in the art, the prior art comprises a series of models of vehicles having tandem or tridem axles, which are particularly used in heavy vehicles for loads transportation, such as the so-called "truck", heavy trucks and the two-axle trucks, as well as in special vehicles, such as construction and mining machinery.

For example, those vehicle models may comprise traction configurations of 6×4, 8×4, 10×4 types, in which out of six, eight or ten contact points, four have traction for providing the vehicle movement. As it is widely known, these four contact points consist of the respective tires and wheels of the assembly of tandem or tridem axles. Furthermore, there are those ones known as tridem, in which there are three tag axles interconnected disposing six contact points. These configurations' purpose is to increase the loading capacity and improve the performance of the vehicle, during the movements, especially when they are loaded.

Although these models of traction having tandem axles disclose a series of advantages and benefits when the vehicle is loaded, i.e., during the vehicle's movement for transportation and goods delivery, as it might be appreciated by the persons skilled in the art, the movement of these unloaded vehicles might become a big inconvenient, since there is an increase in the running's resistance due to the tag contact of the tires with the asphalt and, therefore, resulting in losses concerning fuel consumption, wear and tear of tires and other parts that are submitted to efforts during the unloaded movements.

In this context, some systems developed for reducing these costs, when the vehicle is not fully loaded, are known. These systems consist of systems capable of providing the lift of one or more driven axles in order to reduce the number of tires in contact with the ground.

Nevertheless, as it might be appreciated by the persons skilled in the art, these axle lifting systems usually cannot be used in tag axles. For this reason, in order to eliminate the running resistance of these heavy vehicles, the assemblies of tandem axles comprise lifting systems of one of the axles to work together with the traditional detachment systems. Only then can the friction between the tire and the asphalt be reduced during the movements, and, thus, bring a reduction in terms of fuel consumption due to the reduction of the running resistance.

A system for disengaging an axle tag of a working vehicle, such as a truck, is known, for instance, in the patent application PCT/BR2016/050182, incorporated hereto for reference purposes.

However, it might be desirable that the axle is not lifted when the tag is detached, in situations, for example, in which the vehicle is half-loaded. In this condition, it might be desirable that the axle has the wheels and tires in contact with the ground, however, a condition in which all the axles are tag is not necessary.

In order to avoid the resistance and inertia of the other axle's components, it might be desirable to free the wheel of the half-shaft. The invention shall provide a solution regarding this issue.

SUMMARY OF THE INVENTION

The present invention, thus, in light of the above disclosed, addresses a freewheeling system used in tandem or tridem axles.

It is another objective of the present invention to provide a freewheeling system used, particularly, in tandem axles, that may be easily installed and/or adapted to the existing tag axles assemblies and in operation.

Therefore, regarding the above disclosed, in order to achieve the objectives and technical and functional effects indicated above, amongst others, the present invention relates to a freewheeling system for tandem axles, which comprises a hub cover that it attached to the wheel hub end through fixation means, providing at least one air input for feeding an actuator chamber, within which is accommodated a piston that is attached to a sleeve that attaches to the half-shaft with axial mobility, said sleeve being endowed with a flange having tines that mechanically cooperate with the tines predicted on said wheel hub cover.

According to a possible embodiment of the present invention, said air input predicted on the hub wheel comprises an external configuration, which is adapted for functioning together, or in substitution, of the auto-calibration system usually installed in vehicles. Alternatively, said air input may disclose an internal configuration, within which said wheel hub has an air passage channel or, further, comprises an internal rotational valve capable of feeding said actuator chamber of the present invention's system.

According to a preferably advantageous embodiment of the present invention, the freewheeling system comprises a return element, such as a spring, which is place together with said sleeve, in order to provide its return at the moment of the tines attachment of its flange with the tines predicted in the internal surface of said wheel hub cover.

Lastly, the present invention also addresses a vehicle for transportation of goods comprising at least an assembly of tandem axles, which is formed from at least two driven axles responsible for supporting the wheels with the tires of the vehicle through wheels supporting assemblies comprised by at least one freewheeling system, as previously described. Furthermore, more objectively, said transportation vehicle may be a so-called "truck", heavy trucks, or two-axle trucks, which are endowed with tandem or tridem axles.

BRIEF DESCRIPTION OF THE DRAWINGS

The features, advantages and technical effects of the present invention, as previously indicated, will be more properly understood by a person skilled in the art from the detailed description that follows, prepared only for exemplificative purposes, and non-restrictive, of the preferred embodiments, and with reference to the accompanying drawings, wherein.

DETAILED DESCRIPTION OF THE INVENTION

The invention is now disclosed according to its particular embodiments making reference to the accompanying drawings of embodiments examples. The reference numbers indicated in the Figs. are repeated throughout the different views in order to indicate identical or similar technical features. Furthermore, the terms possibly used herein such as: above, below, top, bottom, lateral, right, left, front, back and their variations must be interpreted according to the guidance given in FIG. 1.

Figure 1:
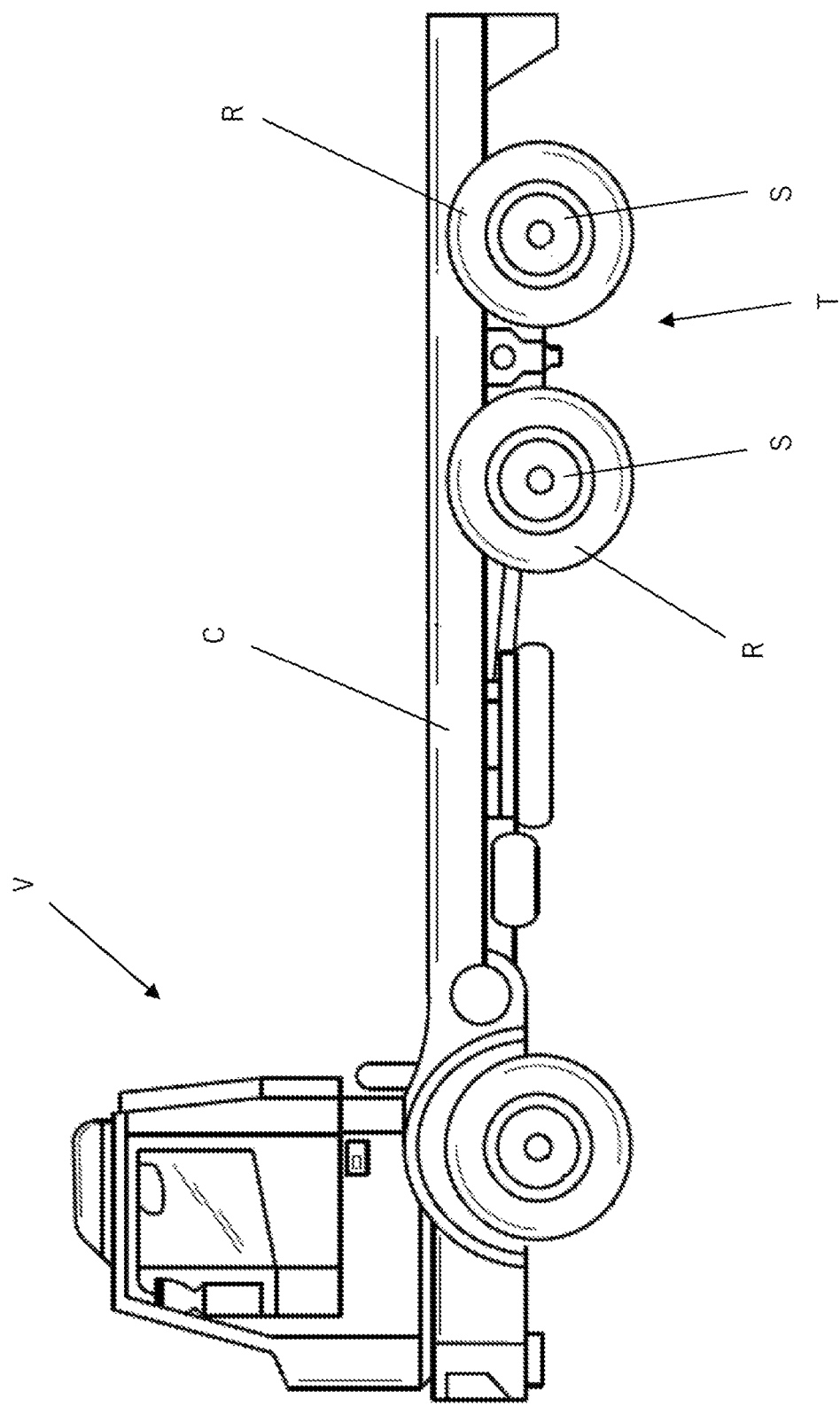
FIG. 1 is a side view of a commercial vehicle, such as a truck, having an assembly of tandem axles.

Firstly, for illustration purposes only and for a better understanding of the present invention, as it may be of the knowledge of the persons skilled in the art, FIG. 1 shows a vehicle (V), for example, a truck having a tensile 6×4 type, which rear chassis portion (C) is endowed with an assembly of tandem axles (T) formed by at least four supporting assemblies (S), or axle hubs, of the wheels (R) of vehicle (V), in which the freewheeling system (10), object of the present invention, is installed in order to provide traction detachment in the drawn wheels (R) of vehicle (V).

The truck may be a conventional known truck having a cabin, operator commands, engine, transmission, Cardan axle, differential etc., wherein said features are not further explained in details for being widely known in the prior art.

Figure 2:
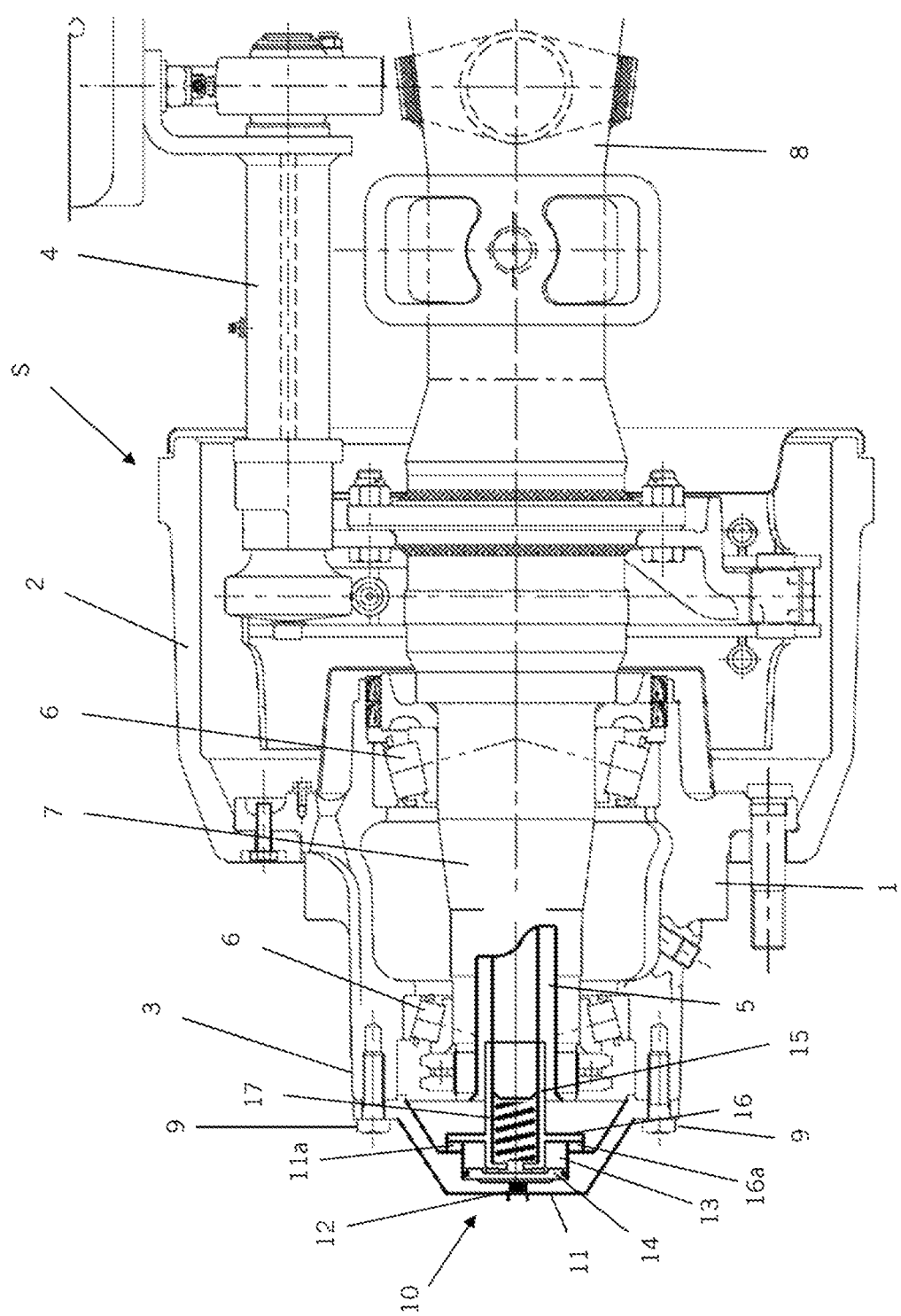
FIG. 2 is a side sectional view of the driven axle end with the wheel supporting assembly of the vehicle comprised with the freewheeling system, according to the present invention, in its natural functioning state and drawn.
Figure 3:
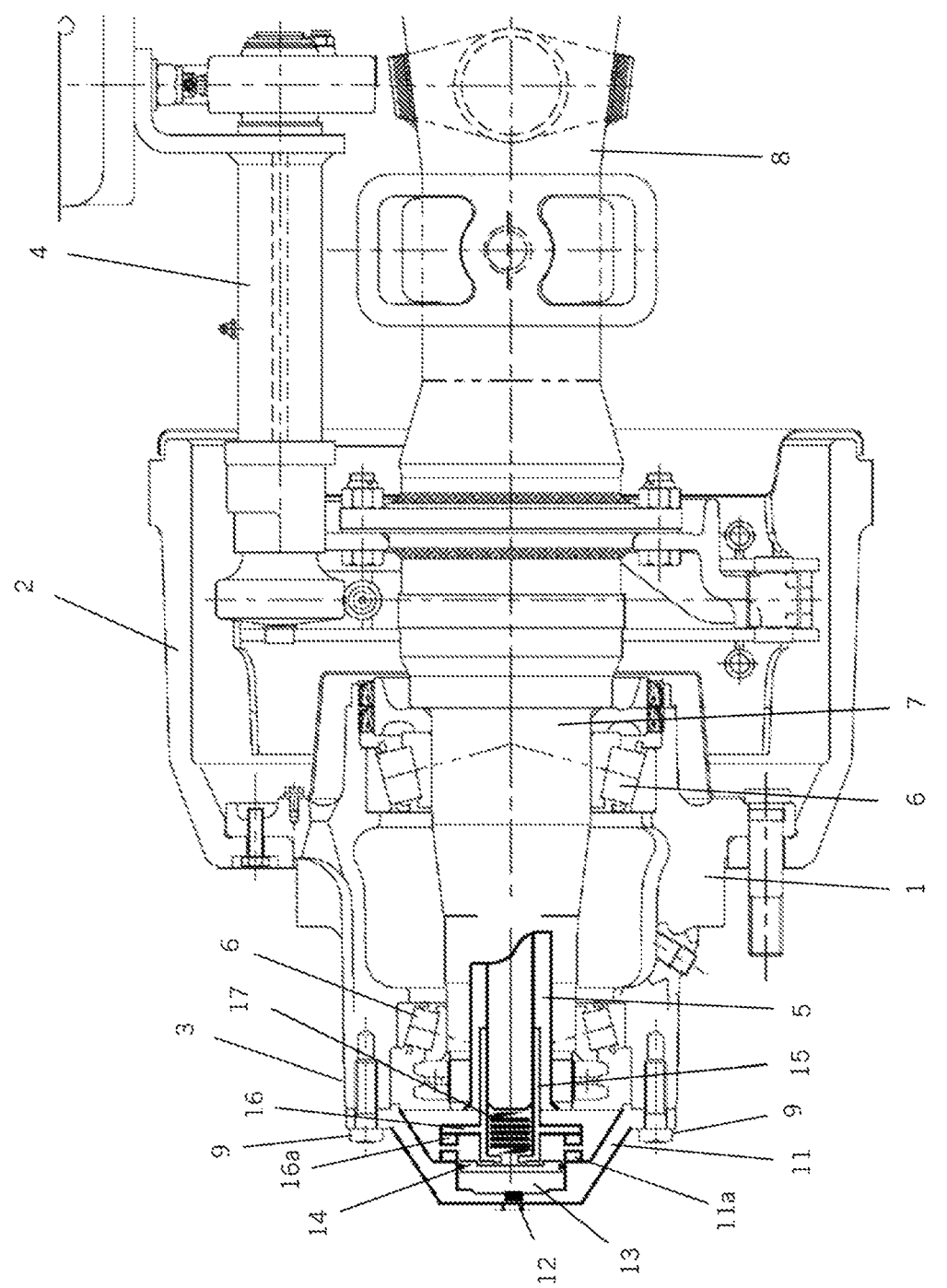
FIG. 3 is a side sectional view of the driven axle end with the wheel supporting assembly of the vehicle having the freewheeling system, according to the present invention, in its activated and not drawn state.

Regarding, now, FIGS. 2 and 3, as it is of the knowledge of the persons skilled in the art, these supporting assemblies (S) of wheels (R) are, usually, formed by the wheel hub 1 which is attached together with the brake drum 2 that accommodates the brake components including the triggering of lining brakes 4, lining brakes (not shown), etc. Alternatively, the brake drum may be substituted by a brake disc and pads system, and they might equally comprise the drive system for a disc system, such as clamp, pistons, etc., components that are already known in the prior art.

The half-shaft 5 coming from the differential passes through the differential housing 8 and is concentric to hub 1 which is supported on a roller bearing 6 supported on the axle end 7. Such formation is common and widely known by the persons skilled in the art, and certain details also commons, such as fastening screws, retainers, means for sealing, air lines, etc., have been intentionally omitted for explanatory purposes.

The freewheeling system 10, according to the present invention, is formed by a hub cover 11 attached to the end 3 of said hub 1 through appropriate fixation means 9, and it is endowed with an air input 12 for feeding an actuator chamber 13 in which a piston 14 is accommodated supportive of a sleeve 15 that, on the other hand, is concentrically inserted to the axle shaft 5, in a susceptible condition of axially displacing. Said sleeve 15 comprises a flange 16 that comprises tines 16a that mechanically cooperate with the tines 11a predicted on said hub cover 11.

According to an optional embodiment of the present invention, said air input 12 may have a configuration of external type, which may take advantage of, including, the auto-calibration system itself existing in vehicles, the so-called "rodoar" and "tire pressure gauge", such as illustrated in the Figs. Alternatively, said air input 12 may have an internal configuration, wherein, for instance, the wheel hub 1 itself comprises an air passage, or further, comprises an internal rotational valve, disclosing a totally independent system from the auto-calibration system.

According to a preferred embodiment of the present invention, said piston 14 comprises a return mean 17, for example, a spring, which purpose is to ensure the piston return to the engaged position, where the tines 16a of the flange 16 are engaged with the tines 11a predicted in the internal side of said hub cover 11, such as shown in FIG. 2, which discloses the loaded vehicle's (V) ordinary functioning condition and with the freewheeling system 10 in the regular working condition, i.e., engaged. Therefore, the power is transmitted from axle shaft 5 towards sleeve 15 and, consequently, towards the wheel hub 1 and, naturally, towards drum 2 or brake disc. In this sense, sleeve 15 is mounted concentrically to the axle shaft 5 in a way that it may displace axially, however, not angularly and, in this sense, said sleeve 15 may comprise tines or an internal spline predicted to be inserted with tines or splines predicted in the external perimeter of the axle shaft 5.

The freewheeling system 10, when triggered, injects air inside the actuator chamber 13 through said air input 12, making the piston 14 to be axially displaced in the axle shaft end 5. Thus, said tines 16a of the flange 16 of the sleeve 15 disengage from the tines 11a of the hub cover 11 and, therefore, it becomes possible to free the mechanical connection thereupon existing between the axle shaft 5 and the hub wheel 1, leaving the wheel totally free. FIG. 3 illustrates this condition in which wheel (R) is totally free.

As it is possible to note, the freewheeling system 10, according to the present invention, can be easily installed and adapted to any tandem axle (T) model, since it slightly affects these axles' structures, considering that its installation occurs, basically, in end 3 of the wheel hub 1 and in the end of the axle shaft 5, not requiring any structural modification in the rest of the components of the already existing tandem axle (T).

Furthermore, it is also possible to note that the maintenance costs of the disengagement axle are considerably reduced upon use of the freewheeling system 10, object of the present invention. That is because, it is possible to eliminate the efforts transmitted from the wheel and tire (R) to the other axle elements, such as the axle shaft, ring and pinion, Cardan, etc., in a condition in which the axle is not drawn, but in contact with the ground.

According to the present invention, the freewheeling system 10 may be easily triggered by the driver of the vehicle (V) through the current available devices in the cabin for controlling and adjusting, for instance, the "tire pressure gauge" systems, or, optionally through independent and stand-alone devices exclusively designed for triggering the feeding of the air input 12 in order to promote the axial displacement of said piston 14 moving the tines 16a away from its flange 16 from the tines 11a of the hub cover 11.

Upon all that has been previously disclosed, it is important to make it clear that the present description only aims to disclose and define, in an exemplificative way, preferred embodiments of the freewheeling system for tandem axles used in transportation vehicles. Therefore, as it might be understood by the persons skilled in the art, several modifications and constructive of equivalent elements are possible without, this way, escaping from the protection scope defined by the accompanying claims.

The invention claimed is:

1. A freewheeling system for tandem axles, the system comprising:
    a wheel hub;
    a wheel hub cover attached to an end of the wheel hub, the wheel hub cover having tines predicted thereon;
    an actuator chamber;
    a piston;
    a sleeve;
    an axle shaft; and
    at least one air input feeding the actuator chamber in which is accommodated the piston that is engaged in the sleeve concentrically mounted in an end of the axle shaft having axial mobility, wherein said sleeve has a flange endowed with tines that mechanically cooperate with the tines predicted on said wheel hub cover.

2. The freewheeling system for tandem axles of claim 1, wherein said air input comprises an external configuration, which is adapted together with an auto-calibration system of a vehicles.

3. The freewheeling system for tandem axles of claim 1, wherein said air input comprises an internal configuration wherein said wheel hub has an air passage channel, or, in addition, has an internal rotational valve.

4. The freewheeling system for tandem axles of claim 1, wherein said piston comprises a return element.

5. The freewheeling system for tandem axles of claim 4, wherein said return element is a spring.

6. A vehicle for transportation of goods, the vehicle comprising:
    a plurality of wheels each with a tire thereon;
    at least an assembly of tandem axles, which is formed by at least two driven axles responsible for supporting the wheels with tires of the vehicle, wherein the assembly of tandem axles include supporting assemblies of the wheels having at least a freewheeling system according to claim 1.

7. The vehicle for transportation of goods of claim 6, wherein the vehicle is a truck, a heavy truck, or a two-axle truck, which are endowed with tandem or tridem axles.

* * * * *